United States Patent [19]

Da Costa

[11] Patent Number: 4,848,822
[45] Date of Patent: Jul. 18, 1989

[54] EXTENSION FOR LIGHT PROTECTION VISOR FOR MOTOR CARS

[76] Inventor: Jose J. P. P. T. Da Costa, Praca do Chile, 8-4°, 1000 Lisbon, Portugal

[21] Appl. No.: 166,837

[22] Filed: Mar. 9, 1988

Related U.S. Application Data

[63] Continuation of Ser. No. 838,285, Mar. 10, 1986, abandoned.

[30] Foreign Application Priority Data

Mar. 13, 1985 [PT] Portugal .................................. 7668

[51] Int. Cl.⁴ .............................................. B60J 3/02
[52] U.S. Cl. .................................................. 296/97.8
[58] Field of Search ................ 296/97 G, 97 K, 97 R; 160/DIG. 3

[56] References Cited

U.S. PATENT DOCUMENTS

| | | | |
|---|---|---|---|
| 4,090,732 | 5/1978 | Vistitsky | 296/97 G |
| 4,167,287 | 9/1979 | Franklin | 296/97 G |
| 4,280,730 | 7/1981 | Turner | 296/97 G |
| 4,352,519 | 10/1982 | Aro | 296/97 G |

Primary Examiner—Robert R. Song
Attorney, Agent, or Firm—Kuhn and Muller

[57] ABSTRACT

A visor extender for an automobile sun visor comprising an extender with two enlongated opposing edges adapted to extend beyond an end of the sun visor, having a clamp for removably fastening the extender to the sun visor, the clamp being movably fastened to the extender by virtue of the clamp being fastened to spaced projections which extend laterally form only one surface of the extender and integrally formed therewith adjacent one of the elongated edges.

8 Claims, 1 Drawing Sheet

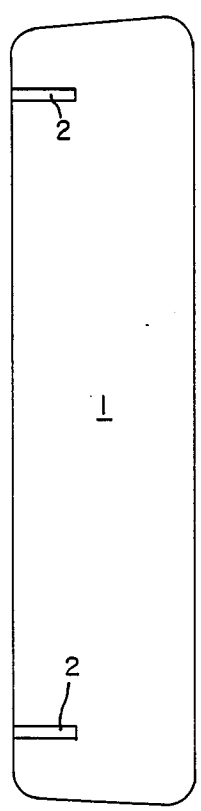
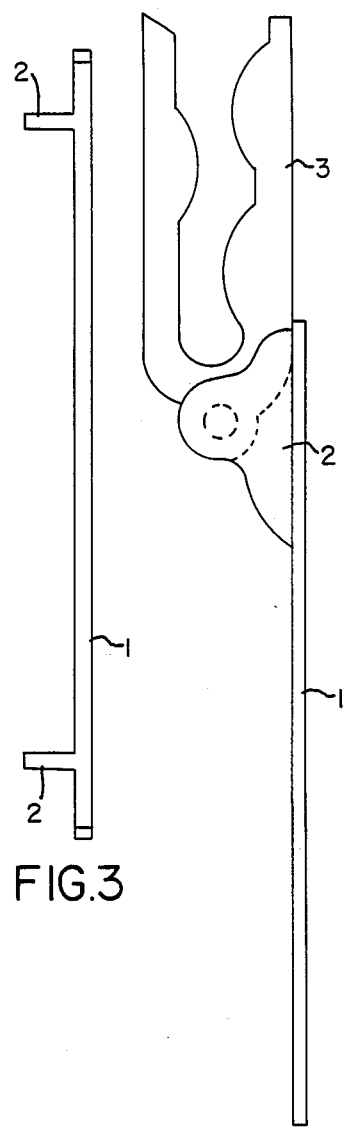
FIG.1
FIG.3
FIG.2

EXTENSION FOR LIGHT PROTECTION VISOR FOR MOTOR CARS

This application is a continuation, of application Ser. No. 838,285, filed Mar. 10, 1986, now abandoned.

FIELD OF THE INVENTION

This invention relates to extenders for automobile vehicles sun visors.

SUMMARY OF THE INVENTION

Given the difficulty of driving when the sun, particularly in the morning or in the evening, hits full in the eyes when the visors with which the cars are equipped are not of sufficient height, we thought of solving the problem by creating an extensor made of a colored material, forming a visior which extends the already existing one, in order to protect our eyes under the above mentioned conditions.

BRIEF DESCRIPTION OF THE DRAWINGS

In the drawings:

FIG. 1 is a plan view of an automobile vehicle sun visor extender in accordance with the invention; and FIG. 2 is a side elevation view of the sun visor of FIG. 1 with clamp means attached thereto.

FIG. 3 is a left edge elevation view of the sun visor of FIG. 1

DESCRIPTION OF A PREFERRED EMBODIMENT

Referring now to the drawings, where like reference numerals refer to like parts, there is shown a visor extender 1 which is adapted to the car visor (not shown) by means of a clamp 3. The clamp 3 is fastened to the visor extender 1 by a fastening shaft 4 which tightly fits into projections 2 which extend laterally from one side of the visor extender 1.

The visor extender 1 is generally a molded plastic material which can be colored and is generally suitable to prevent light from passing through. The visor extender 1 has two spaced projections 2 extending laterally from one side of the visor which are secured to the visor extender and preferably integral therewith by virtue of being formed when the visor extender is molded by, for example, injection molding.

As show in FIG. 2, the clamp 3 for the visor extender 1 can be formed with opposing inner surfaces 5 having a wave like configuration to enhance fastening the clamp 3 and visor extender 1 to an automobile visor. Moreover, the fastening shaft 4 of the clamp 3 includes protuberances 6, such as a known friction increasing means which tightly fit within the projections 2 and serve as a means to allow the extender 1 to be set at a desired angle or position when mounted on an automobile visor.

I claim:

1. Visor extenders for automobile vehicle sun visors comprising:

an extender with two elongated opposing edges adapted to extend beyond an end of an automobile vehicle sun visor having clamp means for removably fastening said extender to said vehicle sun visor;

said clamp means being movably fastened to said visor extending by virtue of said clamp means being fastened to spaced projections extending laterally from only one surface of said visor extender and integrally formed therewith adjacent one of said elongated edges.

2. Visor extenders as claimed in claim 1 wherein said clamps have wavy opposing surface that are adapted to be fastened to an end of an automobile visor.

3. Visor extenders as claimed in claim 1 wherein protuberance contained in a fastening shaft of said clamp fit closely in the projections extending from the surface of said visor extender which permit said extender to be set at a desired angle.

4. Visor extenders as claimed in claim 3, wherein said extender has two spaced projections extending from the surface thereof.

5. Visor extenders as claimed in claim 1, wherein said extender with spaced projections is formed by injection molding.

6. Visor extenders as claimed in claim 1, wherein said elongated opposing edges are substantially parallel.

7. Visor extenders as claimed in claim 6, wherein the surface of said extender extending between said spaced projections is flat.

8. An extender for automotive vehicle sun visors comprising a flat sheet of molded plastic having two elongated parallel opposing edges with two spaced projections extending laterally from one flat surface of said molded plastic adjacent one of said edges and clamp means for releasably fastening said extender to said vehicle sun visor which is movably fastened to said spaced projections by a shaft which tightly fits in said projections.

* * * * *